United States Patent [19]

Hünd et al.

[11] 4,156,613

[45] May 29, 1979

[54] ANTI-CORROSION PIGMENTS

[75] Inventors: Franz Hünd; Günter Linde; Peter Kresse, all of Krefeld, Fed. Rep. of Germany

[73] Assignee: Bayer Aktiengesellschaft, Leverkusen, Fed. Rep. of Germany

[21] Appl. No.: 796,505

[22] Filed: May 12, 1977

[30] Foreign Application Priority Data

Jun. 5, 1976 [DE] Fed. Rep. of Germany ....... 2625401
Sep. 18, 1976 [DE] Fed. Rep. of Germany ....... 2642049

[51] Int. Cl.$^2$ ................................................ C09D 5/08
[52] U.S. Cl. .................. 106/14.39; 106/296; 106/302; 106/304; 106/306
[58] Field of Search ................ 106/14, 286, 296, 302, 106/304, 306; 423/596; 260/29.4, 39 P, 69 R, 41 B

[56] References Cited

U.S. PATENT DOCUMENTS

| | | | |
|---|---|---|---|
| 3,072,495 | 1/1963 | Pitrot | 106/302 |
| 3,836,495 | 9/1974 | Berstein | 260/29.4 UA |
| 3,904,421 | 9/1975 | Shimizu et al. | 106/306 |

*Primary Examiner*—Harold D. Anderson
*Assistant Examiner*—W. Thompson
*Attorney, Agent, or Firm*—Sprung, Felfe, Horn, Lynch & Kramer

[57] ABSTRACT

A pigment of high anti-corrosion properties comprises
(a) about 30 to 70 mole percent of at least one of MgO, ZnO and CaO, and
(b) about 70 to 30 mole percent of $Me_2O_3$ wherein $Me_2O_3$ has the approximate molar percent composition
$Fe_2O_3$: 0–100, preferably 0.5–100, most preferably 1–95, mole %
$Al_2O_3 + Mn_2O_3$: 0–100, preferably 0.5–100, most preferably 1–95, mole %
$Cr_2O_3$: 0–20 mole % is produced by calcining such oxides or compounds yielding such oxides at from about 200° ® to 650° C. with the option of going up to about 950° C. if the Al+Mn+Cr oxides total 10 mole % or more.

23 Claims, No Drawings

ANTI-CORROSION PIGMENTS

Active anti-corrosion pigments, to which considerable practical significance is attributed, are red lead, zinc potassium chromate and zinc dust. By comparison with the iron oxide pigments which are used in large quantities and which are substantially inactive so far as prevention of corrosion is concerned, these active anti-corrosion pigments either have a much higher specific gravity or are considerably more expensive. There has been no shortage of attempts to produce active anti-corrosion pigments on the basis of the inexpensive iron oxide starting materials of relatively low specific gravity. Thus, attempts have been made to produce new anti-corrosion pigments based on iron oxide by calcining zinc and alkaline earth metal oxides, hydroxides and carbonates together with a variety of different iron compounds (oxide, oxide hydroxide, carbonate, sulfate, etc.) at temperatures in the range from 650° C. to 1150° C. However, tests to determine the anti-corrosion effect of these pigments have shown that, although they produce a slight improvement by comparison with standard commercial-grade iron oxide pigments, they do not even remotely approach the standard of the active anti-corrosion pigments mentioned hereinabove.

The object of the present invention is to develop active anti-corrosion pigments based on iron oxide which are equivalent to the known active anti-corrosion pigments in regard to their anti-corrosion effect and which do not have any of the disadvantages of the known anti-corrosion pigments.

The present invention provides anti-corrosion pigments comprising about 30 to 70 mole percent of MeO and about 70 to 30 mole percent of $Me_2O_3$, in which MeO represents MgO and/or CaO and/or ZnO and $Me_2O_3$ represents $(1-x)$ moles of $Fe_2O_3$ plus x moles of $Al_2O_3$ and/or $Mn_2O_3$ wherein x has a value of 0 to 1, preferably of about 0.005 to 1, most preferably about 0.01 to 0.95, with the further proviso that up to about 20 mole percent and preferably about 0.1 to 10 mole percent of the $Me_2O_3$ can be replaced by the corresponding molar quantity of $Cr_2O_3$, the pigments having a specific surface according to BET of about 0.1 to 30 $m^2/g$ and a percentage weight loss per gram of pigment, as determined by the Thompson Corrosion Test, of less than about 0.05% per gram of pigment and preferably of less than about 0.03% per gram of pigment.

The present invention also provides a process for producing anti-corrosion pigments comprising about 30 to 70 mole percent of MeO and about 70 to 30 mole percent of $Me_2O_3$, MeO representing MgO and/or CaO and/or ZnO and $Me_2O_3$ representing $(1-x)$ $Fe_2O_3$ and x moles of $Al_2O_3$ and/or $Mn_2O_3$ and x assuming values of about 0.005 to 1, preferably about 0.01 to 0.95, with the further proviso that, in the presence of $Al_2O_3$ and/or $Mn_2O_3$, up to about 20 mole percent and preferably about 0.1 to 10 mole percent of the $Fe_2O_3$ and/or $Al_2O_3$ and/or $Mn_2O_3$ can be replaced by the corresponding molar quantity of $Cr_2O_3$, which process comprises calcining the corresponding metal oxides or starting materials which give metal oxides on calcination, wherein calcination is carried out at temperatures of about 200° to 650° C., preferably at temperatures of about 300° to 600° C. and, with particular preference, at temperatures of about 400° to 600° C. in the case of pigments with a low content of aluminum oxide, manganese oxide and chromium oxide, and at temperatures of about 200° to 950° C., preferably at temperatures of about 250° to 850° C. and, with particular preference, at temperatures of about 300° to 750° C. in the case of pigments rich in aluminum, manganese and chromium oxide, in the presence of oxygen-containing gases and/or inert gases.

The invention also relates to the use of the pigment according to the invention, produced in accordance with the invention, for the production of rustproofing paints based on anti-corrosion varnishes or anti-corrosion lacquers.

The new active anti-corrosion pigments based on iron oxide are produced by preparing intimate mixtures of about 30 to 70 mole percent of MeO or compounds yielding MeO on calcination and of about 70 to 30 mole percent of $Me_2O_3$, MeO representing MgO and/or CaO and/or ZnO and $Me_2O_3$ representing $(1-x)$ $Fe_2O_3$ and x moles of $Al_2O_3$ and/or $Mn_2O_3$ and x assuming values of about 0.005 to 1, preferably about 0.01 to 0.95, with the further proviso that, in the presence of $Al_2O_3$ and/or $Mn_2O_3$, up to about 20 mole percent and preferably about 0.1 to 10 mole percent of the $Fe_2O_3$ and/or $Al_2O_3$ and/or $Mn_2O_3$ can be replaced by the corresponding molar quantity of $Cr_2O_3$, or of compounds which yield $Me_2O_3$ on calcination, subsequently calcining the mixtures thus prepared at temperatures in a certain range, intensively grinding the product of calcination, optionally recalcining it, followed by cooling and grinding.

The calcination temperature is of crucial importance to the properties of the anti-corrosion pigments obtained. In the case of pigments having a low aluminum oxide, manganese oxide and/or chromium oxide (less than about 10 mole percent) content, the calcination temperature is in the range from about 200° to 650° C., preferably in the range from about 300° to 600° C. and, with particular preference, in the range from about 400° to 600° C. In the case of pigments of relatively high aluminum oxide, manganese oxide and/or chromium oxide contents (at least about 10 and preferably at least about 20 mole percent), the calcination temperatures are in the range from about 200° to 950° C., preferably in the range from about 250° to 850° C. and, with particular preference, in the range from about 300° to 750° C. The calcination time is generally between about 0.1 and 20 hours and preferably between about 0.5 and 10 hours. The anti-corrosion pigments according to the invention have specific surfaces according to BET (G. Brunnauer, P. H. Emmet and H. Teller, J. Amer. Chem. Soc. 60, 309 (1938) of about 0.1 to 30 $m^2/g$ and preferably about 1 to 15 $m^2/g$.

Preferred anti-corrosion pigments in the context of the invention are free from chromium oxide.

In the Thompson Corrosion Test (H. A. Gardener, Physical and Chemical Examinations of Paints, Varnishes, Lacquers and Colours, 11th Edition Bethesda 1950, page 399), the anti-corrosion pigments show corrosion losses per gram of pigment of less than about 0.05% and preferably less than about 0.03% per gram of anti-corrosion pigment. By comparison, an anti-corrosion pigment based on $Pb_3O_4$ shows a percentage loss in the same test of the order of 0.06%, while an active zinc oxide shows a percentage loss of 0.08% (see Table 7 hereinbelow).

Suitable starting compounds for producing the anti-corrosion pigments according to the invention are, in the case of MeO (MeO=MgO and/or CaO and/or ZnO), the oxide or compounds yielding the oxide on calcination, such as hydroxides, hydroxy salts, carbonates, basic carbonates, nitrates, chlorides, sulfates, formates, acetates, oxalates and other organic compounds of calcium. For $Me_2O_3$, it is possible to use any iron, aluminum and/or manganese and/or chromium compounds or compounds which yield trivalent iron and/or aluminum and/or manganese oxide and/or chromium-(III) oxide on calcination, such as oxide hydroxides, hydroxides, hydroxy salts, carbonates, basic carbonates, nitrates, chlorides, sulfates, formates, acetates, oxalates, and organic carboxylates.

In cases where iron or manganese compounds which do not contain the element in trivalent form are used, calcination of the anti-corrosion pigments according to the invention should be carried out in an oxygen-containing atmosphere, preferably air or oxygen-enriched air. In cases where compounds of tetravalent manganese (for example manganese dioxide) are used, calcination should be carried out at such temperature and in such an atmosphere that trivalent manganese oxide is formed. Among the iron compounds, it has proved to be particularly advantageous to use $Fe(OH)_2$, $FeCO_3$ or basic carbonate which may be obtained from iron(II) salts, preferably from iron (II) sulfate solutions, by precipitation with an alkali metal or an alkaline earth metal hydroxide or carbonate.

Other commercially interesting starting materials for iron(III) oxide are the $Fe_3O_4$—, $\alpha$-FeOOH and $\alpha$-$Fe_2O_3$ pigment sludges formed during the reduction of aromatic nitro compounds with iron in acid solution, or the iron oxide yellow ($\alpha$-FeOOH), iron oxide orange ($\gamma$-FeOOH) and iron oxide red ($\alpha$-$Fe_2O_3$) pigments obtainable by the air oxidation process with iron scrap or by precipitation with $Fe(OH)_2$ in the presence of seeds. The red, brown and black iron oxides obtained from iron(II) sulfate containing water of crystallization or free from water of crystallization by roasting oxidation or roasting reduction are also suitable starting compounds for the production of the new anti-corrosion pigments.

Suitable aluminum compounds or mixtures of iron and aluminum compounds are the so-called "red sludges" obtained during the dissociation of aluminum ores in the aluminum industry or iron-free or iron-containing oxide hydroxide ores (boehmite, diaspore) and also aluminum oxide ores containing silicon dioxide or silicates (for example kaolins in the broadest sense).

Starting compounds for manganese are naturally occurring manganese minerals or synthetically produced manganese dioxide and/or manganese dioxide obtained as waste product in organic synthesis, which may be used either individually or in combination with the above-mentioned iron and aluminum compounds for the production of the anti-corrosion pigments according to the invention. Suitable chromium compounds are the trivalent oxides or oxide hydroxides themselves or the crystalline or amorphous hydroxides, oxide hydroxides, oxide aquates, basic carbonates, nitrates, chlorides, sulfates, formates, acetates and oxalates, etc., which yield them on calcination. It is preferred to use $Cr_2O_3$ itself.

In one special embodiment, chromate(VI) or dichromate compounds, for example sodium chromate or sodium dichromate, are reacted with iron(II) salts and/or aluminum and/or manganese(II) salts in suitable quantities with reduction of the chromium(VI) into chromium(III) and oxidation of the Fe(II) and/or Mn(II) into Fe(III) and/or Mn(III), a coprecipiate of chromium(III) and/or aluminum(III), manganese(III) and iron(III) oxide aquate being formed. This coprecipitate is an eminently suitable starting material for the production of the anti-corrosion pigments according to the invention.

Another possible method of producing the oxidic starting materials for the new anti-corrosion pigments is based on the complete or partial common precipitation of Mg(II)-, Ca(II)-, Zn(II)-, Fe(II)- and/or Mn(II)-salt solutions with Me(III) salt solutions (Me(III)=Fe, Al, Mn, Cr) with alkali metal, alkaline, earth metal hydroxides and/or carbonates.

The following Tables 1-6 below show the properties of various anti-corrosion pigments according to the invention in dependence upon their composition and upon the calcination temperature. The anti-corrosion pigments are obtained by preparing intimate mixtures of from 30 to 70 mole percent of MeO or compounds which yield MeO on calcination and of from 70 to 30 mole percent of $Me_2O_3$, MeO representing MgO and/or CaO and/or ZnO and $Me_2O_3$ representing $(1-x)$ $Fe_2O_3$ and x moles of $Al_2O_3$ and/or $Mn_2O_3$ and x assuming values of from 0.005 to 1, preferably from 0.01 to 0.95, with the further proviso that, in the presence of $Al_2O_3$ and/or $Mn_2O_3$ in minimum quantities of 0.005, preferably 0.01, mole per mole of $Fe_2O_3$, up to 20 mole percent and preferably from 0.1 to 10 mole percent of the $Fe_2O_3$ and/or $Al_2O_3$ and/or $Mn_2O_3$ can be replaced by the corresponding molar quantity of $Cr_2O_3$, or of compounds which yield $Me_2O_3$ on calcination, heating the mixtures thus prepared about 1 hour at a temperature 100° C. below the temperatures indicated in Tables 1-6, intensively grinding the product of calcination and then calcining it for 1 hour at the final temperatures indicated in the Tables, followed by cooling and grinding. The absolute quantities of the calcines amount to between 50 and 100 g. The results of the pigment tests of 30 g are shown separately according to system MgO. $(Fe_{1-x}Al_x)_2O_3$ in Table 1,
MgO. $(Fe_{1-x}Mn_x)_2O_3$ in Table 2,
ZnO. $(Fe_{1-x}Al_x)_2O_3$ in Table 3 and
ZnO. $(Fe_{1-x}Mn_x)_2O_3$ in Table 4
CaO. $(Fe_{1-x}Al_x)_2O_3$ in Table 5
CaO. $(Fe_{1-x}Mn_x)_2O_3$ in Table 6 in dependence upon the substitution of the Fe by Al and/or Mn. The Thompson Corrosion Test on the pigments was carried out as follows:

15 or 30 g of pigment (according to apparent density), 60 ml of twice-distilled water and four cleaned, brightly polished razor blades which had been degreased with ether, weighed and tied fast with nylon-6 thread, were introduced into a 200 ml capacity powder bottle provided with a double-bored stopper. The individual powder bottles arranged in a row one behind the other were connected to the various pigment suspensions by glass tubes with empty powder bottles in between. By switching on the laboratory vacuum, a uniform air stream of 60 l/h was passed through over a period of ten days by way of an air rotameter and an Erlenmeyer flask acting as a bubble counter. Under the effect of this air stream, the pigment suspension is constantly whirled around and the pigment is kept in constant contact with the water. After 10 days, the razor blades are removed from each bottle, carefully cleaned, dried and the weight loss determined by re-weighing. The percentage weight loss is divided by the quantity of pigment used. The percentage weight loss per g of pigment is a measure of the intensity of corrosion. The lower this value, the greater the corrosion-inhibiting effect of the pigment. Since the values thus determined are very small, they were multiplied by a factor of $10^3$ in order to simplify a comparative assessment. These values are shown in the last columns of Tables 1 to 7.

For comparison with the anti-corrosion pigments according to the invention, Table 7 shows the corrosion behavior of some inorganic pigments in the Thompson Corrosion Test.

Systems containing chromium(III) oxide actually show an improvement in the anti-corrosion effect of the pigments produced in accordance with the invention by comparison with systems containing only $Al_2O_3$ or $Mn_2O_3$.

Table 1

Corrosion behavior of some pigments containing MgO and (Fe, Al)$_2$O$_3$ in dependence upon the calcination temperature

| Test No. | Composition in mole percent | | | Calcination temperature 1 h - °C. | $10^3 \times$ %-loss/g of Pigment |
|---|---|---|---|---|---|
| | MgO | Fe$_2$O$_3$ | Al$_2$O$_3$ | | |
| 1.1 | 50.0 | 50.0 | — | 400 | 34.7 |
| 1.2 | " | " | — | 500 | 22.0 |
| 1.3 | " | " | — | 600 | 28.0 |
| 1.4 | 50.0 | 40.0 | 10.0 | 400 | 25.1 |
| 1.5 | " | " | " | 500 | 18.2 |
| 1.6 | " | " | " | 600 | 8.0 |
| 1.7 | " | " | " | 700 | 22.8 |
| 1.8 | 50.0 | 25.0 | 25.0 | 400 | 50.4 |
| 1.9 | " | " | " | 500 | 24.3 |
| 1.10 | " | " | " | 600 | 15.8 |
| 1.11 | " | " | " | 700 | 8.3 |
| 1.12 | 50.0 | — | 50.0 | 400 | 2795 |
| 1.13 | " | — | " | 500 | 23.7 |
| 1.14 | " | — | " | 600 | 0.74 |
| 1.15 | " | — | " | 700 | 4.2 |
| 1.16 | 50.0 | 20.0 | 10.0* | 400 | 0.0 |
| 1.17 | " | " | " | 500 | 0.0 |
| 1.18 | " | " | " | 600 | 0.0 |
| 1.19 | " | " | " | 700 | 5.6 |
| 1.20 | " | " | " | 800 | 13.1 |
| 1.21 | " | " | " | 900 | 26.2 |

*additionally containing 10 mole percent of Mn$_2$O$_3$ and 10 mole percent of Cr$_2$O$_3$

Table 2

Corrosion behavior of some pigments containing MgO and (Fe, Mn)$_2$O$_3$ in dependence upon the calcination temperature

| Test No. | Composition in mole percent | | | Calcination temperature 1 h - °C. | $10^3 \times$ %-loss/g of Pigment |
|---|---|---|---|---|---|
| | MgO | Fe$_2$O$_3$ | Mn$_2$O$_3$ | | |
| 2.1 | 50.0 | 49.5 | 0.5 | 400 | 23.2 |
| 2.2 | " | " | " | 500 | 14.5 |
| 2.3 | " | " | " | 600 | 29.5 |
| 2.4 | 50.0 | 40.0 | 10.0 | 400 | 29.0 |
| 2.5 | " | " | " | 500 | 38.1 |
| 2.6 | " | " | " | 600 | 37.1 |
| 2.7 | 50.0 | 25.0 | 25.0 | 400 | 30.8 |
| 2.8 | " | " | " | 500 | 11.8 |
| 2.9 | " | " | " | 600 | 39.8 |
| 2.10 | 50.0 | — | 50.0 | 400 | 41.0 |
| 2.11 | " | — | " | 500 | 16.7 |
| 2.12 | " | — | " | 600 | 67.8 |

Table 3

Corrosion behavior of some pigments containing ZnO and (Fe, Al)$_2$O$_3$ in dependence upon the calcination temperature

| Test No. | Composition in mole percent | | | Calcination temperature 1 h - °C. | $10^3 \times$ %-loss/g of Pigment |
|---|---|---|---|---|---|
| | ZnO | Fe$_2$O$_3$ | Al$_2$O$_3$ | | |
| 3.1 | 50.0 | 50.0 | — | 400 | 25.6 |
| 3.2 | " | " | — | 500 | 29.6 |
| 3.3 | " | " | — | 600 | 36.3 |
| 3.4 | 50.0 | 47.5 | 2.5 | 400 | 34.7 |
| 3.5 | " | " | " | 500 | 37.0 |
| 3.6 | " | " | " | 600 | 32.5 |
| 3.7 | 50.0 | 45.0 | 5.0 | 400 | 64.4 |
| 3.8 | " | " | " | 500 | 42.9 |
| 3.9 | " | " | " | 600 | 50.4 |
| 3.10 | " | " | " | 700 | 327.0 |
| 3.11 | " | " | " | 800 | 1,553.0 |
| 3.12 | 50.0 | 40.0 | 10.0 | 400 | 68.9 |
| 3.13 | " | " | " | 500 | 37.5 |
| 3.14 | " | " | " | 600 | 33.9 |
| 3.15 | " | " | " | 700 | 74.2 |
| 3.16 | " | " | " | 800 | 491.8 |
| 3.17 | 50.0 | 25.0 | 25.0 | 400 | 133.1 |
| 3.18 | " | " | " | 500 | 67.4 |
| 3.19 | " | " | " | 600 | 39.7 |
| 3.20 | " | " | " | 700 | 19.7 |
| 3.21 | " | " | " | 800 | 146.7 |
| 3.22 | 50.0 | — | 50.0 | 400 | 86.9 |
| 3.23 | " | — | " | 500 | 59.8 |
| 3.24 | " | — | " | 600 | 79.5 |

Table 4

Corrosion behavior of some pigments containing ZnO and (Fe, Mn)$_2$O$_3$ in dependence upon the calcination temperature

| Test No. | Composition in mole percent | | | Calcination temperature 1 h - °C. | $10^3 \times$ %-loss/g of Pigment |
|---|---|---|---|---|---|
| | ZnO | Fe$_2$O$_3$ | Mn$_2$O$_3$ | | |
| 4.1 | 50.0 | 47.5 | 2.5 | 400 | 16.6 |
| 4.2 | " | " | " | 500 | 18.3 |
| 4.3 | " | " | " | 600 | 19.9 |
| 4.4 | 50.0 | 40.0 | 10.0 | 400 | 11.9 |
| 4.5 | " | " | " | 500 | 19.3 |
| 4.6 | " | " | " | 600 | 16.0 |
| 4.7 | 50.0 | 25.0 | 25.0 | 400 | 20.9 |
| 4.8 | " | " | " | 500 | 27.1 |
| 4.9 | " | " | " | 600 | 18.3 |
| 4.10 | 50.0 | 20.0 | 10.0* | 400 | 15.3 |
| 4.11 | " | " | " | 500 | 21.7 |
| 4.12 | " | " | " | 600 | 22.9 |
| 4.13 | " | " | " | 700 | 21.0 |
| 4.14 | " | " | " | 800 | 31.2 |
| 4.15 | " | " | " | 900 | 48.5 |

*additionally containing 10 mole % of Al$_2$O$_3$ + 10 mole % of Cr$_2$O$_3$

Table 5

Corrosion behavior of some pigments containing CaO and (Fe, Al)$_2$O$_3$ in dependence upon the calcination temperature (30 g of pigment/60 ml of H$_2$O)

| Test No. | Composition in mole percent | | | Calcination temperature 1 h - °C. | $10^3 \times$ %-loss/g of Pigment |
|---|---|---|---|---|---|
| | CaO | Fe$_2$O$_3$ | Al$_2$O$_3$ | | |
| 5.1 | 50.0 | 50.0 | — | 500 | 5.1 |
| 5.2 | 50.0 | 50.0 | — | 600 | 3.4 |
| 5.3 | 50.0 | 50.0 | — | 700 | 5.1 |
| 5.4 | 50.0 | 50.0 | — | 800 | 7.2 |
| 5.5 | 50.0 | 49.5 | 0.5 | 400 | 0.0 |
| 5.6 | 50.0 | 49.5 | 0.5 | 500 | 0.0 |
| 5.7 | 50.0 | 49.5 | 0.5 | 600 | 0.0 |
| 5.8 | 50.0 | 49.5 | 0.5 | 800 | 15.7 |
| 5.9 | 50.0 | 47.5 | 2.5 | 400 | 12.3 |
| 5.10 | 50.0 | 47.5 | 2.5 | 500 | 0.0 |
| 5.11 | 50.0 | 47.5 | 2.5 | 600 | 15.8 |
| 5.12 | 50.0 | 47.5 | 2.5 | 700 | 0.0 |
| 5.13 | 50.0 | 45.0 | 5.0 | 400 | 0.0 |
| 5.14 | 50.0 | 45.0 | 5.0 | 500 | 0.0 |
| 5.15 | 50.0 | 45.0 | 5.0 | 600 | 0.0 |
| 5.16 | 50.0 | 45.0 | 5.0 | 800 | 10.7 |
| 5.17 | 50.0 | 25.0 | 25.0 | 400 | 0.0 |
| 5.18 | 50.0 | 25.0 | 25.0 | 500 | 2.6 |
| 5.19 | 50.0 | 25.0 | 25.0 | 600 | 0.0 |
| 5.20 | 50.0 | 25.0 | 25.0 | 800 | 0.7 |
| 5.21 | 50.0 | 12.5 | 37.5 | 400 | 0.0 |

Table 5-continued

Corrosion behavior of some pigments containing CaO and (Fe, Al)$_2$O$_3$ in dependence upon the calcination temperature (30 g of pigment/60 ml of H$_2$O)

| Test No. | Composition in mole percent CaO | Fe$_2$O$_3$ | Al$_2$O$_3$ | Calcination temperature 1 h - °C. | 10$^3$ × %-loss/g of Pigment |
|---|---|---|---|---|---|
| 5.22 | 50.0 | 12.5 | 37.5 | 500 | 0.0 |
| 5.23 | 50.0 | 12.5 | 37.5 | 600 | 0.0 |
| 5.24 | 50.0 | 12.5 | 37.5 | 800 | 0.0 |
| 5.25 | 50.0 | — | 50.0 | 400 | 0.0 |
| 5.26 | 50.0 | — | 50.0 | 500 | 0.0 |
| 5.27 | 50.0 | — | 50.0 | 600 | 0.0 |
| 5.28 | 50.0 | — | 50.0 | 800 | 0.0 |
| 5.29 | 50.0 | — | 50.0 | 900 | 0.0 |

Table 6

Corrosion behavior of some pigments containing CaO and (Fe, Mn)$_2$O$_3$ in dependence upon the calcination temperature (30 g of pigment/60 ml of H$_2$O)

| Test No. | Composition in mole percent CaO | Fe$_2$O$_3$ | Mn$_2$O$_3$ | Calcination temperature 1 h - °C. | 10$^3$ × %-loss/g of Pigment |
|---|---|---|---|---|---|
| 6.1 | 50.0 | 50.0 | — | 400 | 0.0 |
| 6.2 | 50.0 | 50.0 | — | 500 | 0.0 |
| 6.3 | 50.0 | 50.0 | — | 600 | 11.3 |
| 6.4 | 50.0 | 49.5 | 0.5 | 400 | 0.0 |
| 6.5 | 50.0 | 49.5 | 0.5 | 500 | 0.0 |
| 6.6 | 50.0 | 49.5 | 0.5 | 600 | 12.8 |
| 6.7 | 50.0 | 47.5 | 2.5 | 400 | 0.0 |
| 6.8 | 50.0 | 47.5 | 2.5 | 500 | 10.4 |
| 6.9 | 50.0 | 47.5 | 2.5 | 600 | 11.3 |
| 6.10 | 50.0 | 45.0 | 5.0 | 400 | 27.1 |
| 6.11 | 50.0 | 45.0 | 5.0 | 500 | 10.7 |
| 6.12 | 50.0 | 45.0 | 5.0 | 600 | 10.1 |
| 6.13 | 50.0 | 40.0 | 10.0 | 400 | 3.1 |
| 6.14 | 50.0 | 40.0 | 10.0 | 500 | 0.0 |
| 6.15 | 50.0 | 40.0 | 10.0 | 600 | 0.0 |
| 6.16 | 50.0 | — | 50.0 | 400 | 0.0 |
| 6.17 | 50.0 | — | 50.0 | 500 | 0.9 |
| 6.18 | 50.0 | — | 50.0 | 600 | 27.4 |
| 6.19 | 50.0 | 20.0 | 10.0+ | 400 | 0.0 |
| 6.20 | 50.0 | 20.0 | 10.0+ | 500 | 4.3 |
| 6.21 | 50.0 | 20.0 | 10.0+ | 600 | 0.0 |
| 6.22 | 50.0 | 20.0 | 10.0+ | 700 | 0.0 |
| 6.23 | 50.0 | 20.0 | 10.0+ | 800 | 0.0 |
| 6.24 | 50.0 | 20.0 | 10.0++ | 400 | 0.0 |
| 6.25 | 50.0 | 20.0 | 10.0++ | 500 | 0.0 |
| 6.26 | 50.0 | 20.0 | 10.0++ | 600 | 0.0 |
| 6.27 | 50.0 | 20.0 | 10.0++ | 700 | 0.0 |
| 6.28 | 50.0 | 20.0 | 10.0++ | 800 | 0.0 |
| 6.29 | 50.0 | 20.0 | 10.0++ | 900 | 0.2 |

+ and in addition 20 mole percent of Al$_2$O$_3$
++ and in addition 10 mole percent of Al$_2$O$_3$ and 10 mole percent of Cr$_2$O$_3$

Table 7

Corrosion behavior of some inorganic Pigments in the Thompson Test:

| Test No. | Type of pigment | g of pigment/60 ml. H$_2$O | Loss (%) | 10$^3$ × %-loss/g of Pigment |
|---|---|---|---|---|
| 7.1 | α-FeOOH | 15 | 10.10 | 673.0 |
| 7.2 | α-Fe$_2$O$_3$ | 30 | 5.05 | 168.0 |
| 7.3 | Fe$_3$O$_4$ | 30 | 10.36 | 345.0 |
| 7.4 | γ-CrOOH | 15 | 1.69 | 113.0 |
| 7.5 | Pb$_3$O$_4$ | 30 | 1.73 | 57.7 |
| 7.6 | ZnO | 15 | 1.20 | 80.4 |

It will be appreciated that the instant specification and examples are set forth by way of illustration and not limitation, and that various modifications and changes may be made without departing from the spirit and scope of the present invention.

What is claimed is:

1. An anti-corrosion pigment consisting essentially of
   (a) about 30 to 70 mole percent of at least one of MgO, ZnO and CaO, and
   (b) about 70 to 30 mole percent of Me$_2$O$_3$ wherein Me$_2$O$_3$ has the approximate molar percent composition
   Fe$_2$O$_3$: 0–95 mole %
   Al$_2$O$_3$+Mn$_2$O$_3$: 0.5–50 mole %
   Cr$_2$O$_3$: 0–20 mole %
   the pigment having a specific surface according to BET of about 0.1 to 30 m$^2$/g and having a percentage weight loss per gram of pigment, as determined by the Thompson Corrosion Test, of less than about 0.05% per gram of pigment.

2. An anti-corrosion pigment as claimed in claim 1, wherein Me$_2$O$_3$ has the approximate molar percent composition
   Fe$_2$O$_3$: 5–99 mole %
   Al$_2$O$_3$+Mn$_2$O$_3$: 1–50 mole %
   Cr$_2$O$_3$: 0–20 mole %.

3. An anti-corrosion pigment as claimed in claim 1, wherein Me$_2$O$_3$ has the approximate molar percent composition
   Fe$_2$O$_3$: 5–99 mole %
   Al$_2$O$_3$+Mn$_2$O$_3$: 1–50 mole %
   Cr$_2$O$_3$: 0.1–10 mole %

4. An anti-corrosion pigment as claimed in claim 1, having a percentage weight loss per gram of pigment, as determined by the Thompson Corrosion Test, of less than about 0.03% per gram of pigment.

5. A process for producing an anti-corrosion pigment as claimed in claim 1, wherein the pigment has a low content of aluminum oxide plus manganese oxide plus chromium oxide, the process comprising calcining the corresponding metal oxides or starting materials which give metal oxides on calcination at a temperature of from about 200° to 650° C. in the presence of at least one of an oxygen-containing gas and an inert gas.

6. A process as claimed in claim 5, wherein the calcination temperature is from about 300° C. to 600° C.

7. A process as claimed in claim 6, wherein the calcination temperature is from about 400° C. to 600° C.

8. A process as claimed in claim 5, wherein at least one hydroxide oxide, hydroxy salt, carbonate, basic carbonate, nitrate, sulfate, chloride, formate, acetate or oxalate of Mg, Zn or Ca is present in the material being calcined.

9. A process as claimed in claim 5, wherein at least one member selected from the group consisting of Fe-(II)-oxide, hydroxide, hydroxy salt, carbonate, basic carbonate, nitrate, chloride, sulfate, formate, acetate or oxalate, and iron(III)oxides is used as starting material for Fe$_2$O$_3$, and calcination is carried out in the presence of an oxygen-containing gas.

10. A process as claimed in claim 5, wherein at least one of α-, β- and γ-iron(III)oxides, α-, β-, γ- and δ-iron-(III) oxide hydroxide, amorphous iron(III)hydroxide, iron(III)sulfate, nitrate, chloride, formate, acetate and other iron(III)salts of organic compounds and iron(II)-iron(III)-oxides is used as the starting material for Fe$_2$O$_3$.

11. A process as claimed in claim 5, wherein the pigment contains Al$_2$O$_3$, and at least one of natural or synthetically produced oxides, oxide hydroxides, hydroxides, amorphous hydroxides of aluminum, solid solutions of aluminum with iron, silicate-containing compounds of aluminum and the "red sludge" formed during the dissociation of iron-containing aluminum ore for the production of aluminum metal is used as the starting material for Al$_2$O$_3$.

12. A process as claimed in claim 5, wherein the pigment contains Mn$_2$O$_3$ and at least one of naturally occurring manganese minerals, synthetically produced manganese dioxide and the manganese dioxide obtained as a waste product in organic syntheses is used as the starting material for Mn$_2$O$_3$.

13. A process as claimed in claim 5, wherein the starting material comprises at least one mixed hydroxide or oxide hydroxide of Fe(III), Al(III), Mn(II), Mn(III) and Cr(III).

14. A process for producing an anti-corrosion pigment as claimed in claim 1, wherein the pigment is rich in aluminum plus manganese plus chromium oxides, the process comprising calcining the corresponding metal oxides or starting materials which give metal oxides on calcination at a temperature of from about 200° to 950° C. in the presence of at least one of an oxygen-containing gas and an inert gas.

15. A process as claimed in claim 8, wherein the calcination temperature is from about 250° C. to 850° C.

16. A process as claimed in claim 8, wherein the calcination temperature is from about 300° C. to 750° C.

17. A process as claimed in claim 14, wherein at least one hydroxide, hydroxy salt, carbonate, basic carbonate, nitrate, sulfate, chloride, formate, acetate or oxalate of Mg, Zn or Ca is present in the material being calcined.

18. A process as claimed in claim 14, wherein at least one member selected from the group consisting of Fe(II)oxide, hydroxide, hydroxy salt, carbonate, basic carbonate, nitrate, chloride, sulfate, formate, acetate or oxalate, and iron(III)oxides is used as starting material for Fe$_2$O$_3$, and calcination is carried out in the presence of an oxygen-containing gas.

19. A process as claimed in claim 14, wherein at least one of α-, β- and γ-iron(III)oxides, α-, β-, γ- and δ-iron(III) oxide hydroxide, amorphous iron(III)hydroxide, iron(III)sulfate, nitrate, chloride, formate, acetate and other iron(III)salts of organic compounds and iron(II)-iron(III)-oxides is used as the starting materials for Fe$_2$O$_3$.

20. A process as claimed in claim 14, wherein the pigment contains Al$_2$O$_3$, and at least one of natural or synthetically produced oxides, oxide hydroxides, hydroxides, amorphous hydroxides of aluminum, solid solutions of aluminum with iron, silicate-containing compounds of aluminum and the "red sludge" formed during the dissociation of iron-containing aluminum ore for the production of aluminum metal is used as the starting material for Al$_2$O$_3$.

21. A process as claimed in claim 14, wherein the pigment contains Mn$_2$O$_3$ and at least one of naturally occurring manganese minerals, synthetically produced manganese dioxide and the manganese dioxide obtained as a waste product in organic synthesis is used as the starting material for Mn$_2$O$_3$.

22. A process as claimed in claim 14, wherein the starting material comprises at least one mixed hydroxide or oxide hydroxide of Fe(III), Al(III), Mn(II), Mn(III) and Cr(III).

23. A varnish or a lacquer containing an anti-corrosion pigment as claimed in claim 1.

* * * * *